No. 835,375. PATENTED NOV. 6, 1906.
E. W. STAUFFER.
SHEEP HOOK.
APPLICATION FILED OCT. 28, 1905.
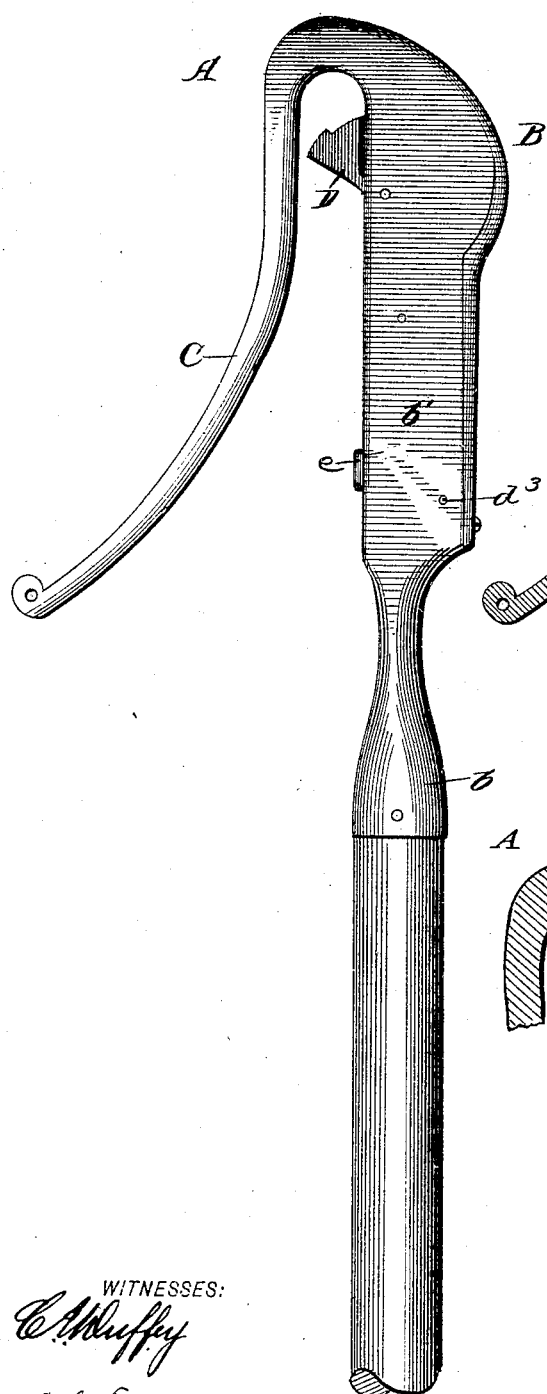
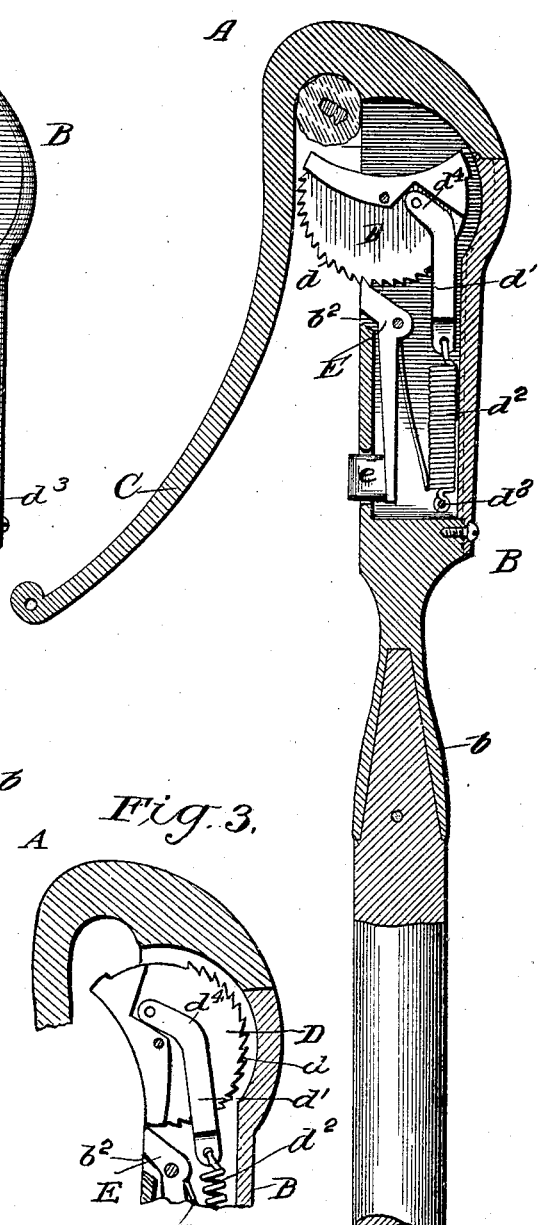
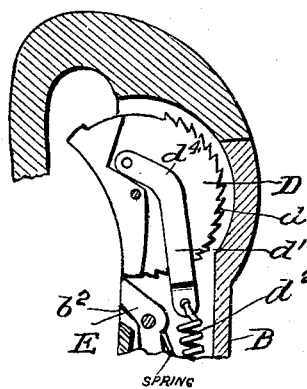
WITNESSES:
INVENTOR
ELGAR W. STAUFFER
BY
ATTORNEYS

UNITED STATES PATENT OFFICE.

ELGAR WASHINGTON STAUFFER, OF CHINOOK, MONTANA, ASSIGNOR TO J. HENRY EVERS, OF CHINOOK, MONTANA.

SHEEP-HOOK.

No. 835,375.　　　　Specification of Letters Patent.　　　　Patented Nov. 6, 1906.

Application filed October 28, 1905. Serial No. 284,804.

*To all whom it may concern:*

Be it known that I, ELGAR WASHINGTON STAUFFER, a citizen of the United States, and a resident of Chinook, in the county of Chouteau and State of Montana, have invented certain new and useful Improvements in Sheep-Hooks, of which the following is a specification.

My invention is an improvement in sheep-hooks; and it consists in certain novel constructions and combinations of parts hereinafter described and claimed.

Referring to the drawings forming a part hereof, Figure 1 is a side elevation of my improvement with the catch in its normal or inoperative position. Fig. 2 is a longitudinal section of the same with the catch in its operative position, and Fig. 3 is a longitudinal section with the catch in its inoperative position.

In the practical application of my invention I provide a hook A, comprising a shank B, and a hook proper, C, the hook proper being integral with the shank and extending backward in substantial parallelism therewith, but diverging outwardly at its free end therefrom. The shank B comprises a socket portion $b$ for receiving a handle and a flattened portion $b'$, having therein a mortise $b^2$. A crescent-shaped catch D is pivoted within the mortise by its center, and the outer edge of the catch is provided with ratchet-teeth $d$ for a purpose to be hereinafter described. An arm $d'$ is connected at one end to a spiral spring $d^2$, secured to a pin $d^3$, traversing the flattened portion, the other end of the arm being provided with an angle portion $d^4$, pivoted to the side of the catch near the inner edge thereof. A pawl E, actuated by a spring $e'$, is pivoted within the mortise for engaging the ratchet-teeth of the catch, the outer end of the pawl being provided with a button $e$, projecting into the space between the hook proper and the shank for convenience in manipulating the pawl.

It will be evident from the description that when the crescent-shaped catch is rotated into a position such that the outer end—that is, the end nearest to the connection of the hook proper with the shank—projects outwardly into the space between the hook proper and the shank the connection of the arm with the catch will be outside of a line through the center of the catch and parallel with the long center of the shank—that is, the pull of the arm will be exerted directly against or a trifle outside of the pivot of the catch. When the hook is engaged with the leg of the sheep, the pressure of the leg upon the projecting end of the catch will depress the same until the attachment of the arm is within the above-mentioned line, when the tension of the spring will rotate the catch to project the inner end of the catch across the space between the hook proper and the shank to form a loop. When in this position, the pawl engaging the ratchet-teeth locks the catch in place, thus firmly retaining the leg of the sheep within the loop. When it is desired to release the sheep, the button is depressed to release the pawl and the leg is drawn backwardly, thus rotating the catch to again project the outer end into position to be engaged by the leg of the next sheep.

My improved hook while simple in construction is very efficient and is easily operated without injury to the leg of the sheep. Very slight pressure is required to release the catch or to return it into an operative position. When in operative position, it is impossible for the sheep to release itself from the hook.

While I have described the improvement as a sheep-hook, it is obvious that it might be used with equal facility as a goose-hook or a turkey-hook, in which case, however, it would be advisable to construct the same of lighter material. The strength of the spring should be regulated to correspond with the weight of the object to be engaged by the hook.

What I claim as new, and desire to secure by Letters Patent, is—

1. The combination with a sheep-hook comprising a shank provided with a socket and a hook proper extending backwardly along the shank and diverging outwardly therefrom at its free end, of a crescent-shaped catch pivoted by its center within the shank, and provided with ratchet-teeth on its outer edge, means whereby to retain the catch with one of its ends projecting into the space between the shank and the hook proper, means whereby pressure upon the projecting end may release the retaining means, a spring for rotating the catch to project the opposite end thereof across the space between the shank and the hook proper, a pawl for engaging the ratchet-teeth to maintain the catch in operative position, and a spring for actuating the pawl.

2. A sheep-hook comprising a shank and a hook proper spaced apart from the shank, a crescent-shaped catch pivoted within the shank, means for maintaining said catch with one of its arms extending across the space between the shank and the hook proper, means whereby pressure upon said arm may release said retaining means, and means for partially rotating said catch whereby to retract said first-named arm and to extend the other arm across said space, and means for locking the catch in such position.

3. A sheep-hook comprising a shank, and a hook proper spaced apart from the shank, a catch having an arm normally projecting into the space between the hook proper and the shank, and an arm normally lying within an opening in the shank, a spring for the catch, and means whereby pressure upon said projecting arm may actuate the spring to swing the catch whereby to extend the other arm across said space, and means for retaining the catch in said last-named position.

4. A sheep-hook comprising a shank and a hook proper spaced apart from the shank, a catch having an arm normally projecting into the space between the hook proper and the shank, and an arm normally lying within an opening in the shank, a spring for the catch, and means whereby pressure upon said projecting arm may actuate the spring to swing the catch whereby to extend the other arm across said space.

5. A sheep-hook having a normally unobstructed mouth, a spring-actuated catch having an arm normally projecting into the mouth of the hook, and an arm normally lying to one side of the said mouth, and means whereby pressure upon said projecting arm may operate to swing the catch whereby to bring the other arm across the mouth of the hook.

ELGAR WASHINGTON STAUFFER.

Witnesses:
R. E. O'KEEFE,
W. B. SANDS.